US006843960B2

(12) United States Patent
Krumpelt et al.

(10) Patent No.: US 6,843,960 B2
(45) Date of Patent: Jan. 18, 2005

(54) COMPOSITIONALLY GRADED METALLIC PLATES FOR PLANAR SOLID OXIDE FUEL CELLS

(75) Inventors: Michael Krumpelt, Naperville, IL (US); Terry Alan Cruse, Lisle, IL (US); John David Carter, Bolingbrook, IL (US); Jules L. Routbort, Hinsdale, IL (US); Romesh Kumar, Naperville, IL (US)

(73) Assignee: The University of Chicago, Chicago, IL (US)

( * ) Notice: Subject to any disclaimer, the term of this patent is extended or adjusted under 35 U.S.C. 154(b) by 50 days.

(21) Appl. No.: 10/167,832

(22) Filed: Jun. 12, 2002

(65) Prior Publication Data

US 2003/0231973 A1 Dec. 18, 2003

(51) Int. Cl.[7] .................................................. B22F 3/00

(52) U.S. Cl. ................................ 419/6; 419/9; 419/10; 419/40

(58) Field of Search ........................... 419/6, 9, 10, 40, 419/2, 7

(56) References Cited

U.S. PATENT DOCUMENTS 3,653,884 A * 4/1972 Davies et al. ................. 419/40
3,658,517 A * 4/1972 Davies et al. ................. 419/36
4,749,632 A 6/1988 Flandermeyer et al. ....... 429/12
4,780,437 A * 10/1988 Smith ......................... 502/101
4,849,163 A * 7/1989 Bellis et al. .................... 419/3
5,049,456 A 9/1991 Matsuhiro et al. ............ 429/12
5,110,541 A * 5/1992 Yamamasu et al. ............ 419/2
5,143,751 A 9/1992 Richards et al. ......... 427/126.3
5,185,301 A 2/1993 Li et al. ...................... 501/117
5,290,642 A * 3/1994 Minh et al. .................... 429/33
5,298,469 A 3/1994 Haig et al. .................. 501/117
5,733,682 A 3/1998 Quadakker et al. ......... 429/210
5,839,049 A * 11/1998 Ettel et al. ...................... 419/2
5,848,351 A * 12/1998 Hoshino et al. ............ 428/550
5,942,349 A 8/1999 Badwal et al. ................ 429/34
5,946,664 A * 8/1999 Ebisawa ..................... 428/550
5,958,304 A 9/1999 Khandkar et al. ....... 252/519.5
5,966,580 A * 10/1999 Watanabe et al. .............. 419/9
6,054,231 A 4/2000 Vikar et al. ................... 429/34
6,265,095 B1 7/2001 Hartvigsen et al. ........... 429/32
6,280,868 B1 8/2001 Badwal et al. ................ 429/34
6,326,096 B1 12/2001 Vikar et al. ................... 429/30
6,451,485 B1 * 9/2002 James et al. ................ 429/232
6,592,787 B2 * 7/2003 Pickrell et al. ............... 264/44

* cited by examiner

*Primary Examiner*—Ngoclan T. Mai
(74) *Attorney, Agent, or Firm*—Joan Pennington

(57) ABSTRACT

A method for preparing compositionally graded metallic plates and compositionally graded metallic plates suitable for use as interconnects for solid oxide fuel cells are provided. The method of the invention, utilizing powder metallurgy, enables making metallic plates of generally any desired composition to meet the corrosion requirements of fuel cells and other applications, and enables making metallic plates of graded composition from one surface of the plate to the other. A powder of the desired alloy composition is obtained, then solvents, dispersants, a plasticizer and an organic binder are added to form a slip. The slip is then formed into a layer on a desired substrate that can be flat or textured. Once dried, the layer is removed from the substrate and the binder is burned out. The layer is sintered in a reducing atmosphere at a set temperature for a predefined duration specific to the materials used and the desired final properties.

10 Claims, 5 Drawing Sheets

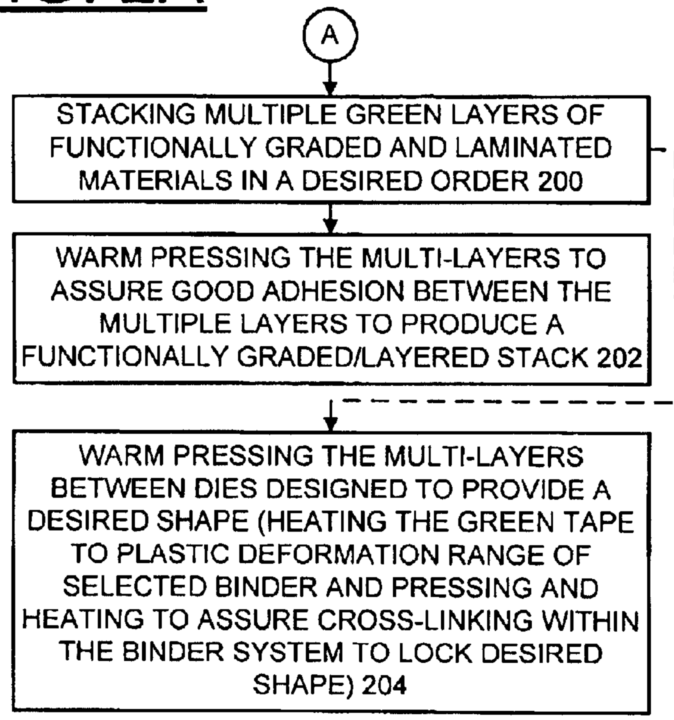
FIG. 2A
A
STACKING MULTIPLE GREEN LAYERS OF FUNCTIONALLY GRADED AND LAMINATED MATERIALS IN A DESIRED ORDER 200
WARM PRESSING THE MULTI-LAYERS TO ASSURE GOOD ADHESION BETWEEN THE MULTIPLE LAYERS TO PRODUCE A FUNCTIONALLY GRADED/LAYERED STACK 202
WARM PRESSING THE MULTI-LAYERS BETWEEN DIES DESIGNED TO PROVIDE A DESIRED SHAPE (HEATING THE GREEN TAPE TO PLASTIC DEFORMATION RANGE OF SELECTED BINDER AND PRESSING AND HEATING TO ASSURE CROSS-LINKING WITHIN THE BINDER SYSTEM TO LOCK DESIRED SHAPE) 204

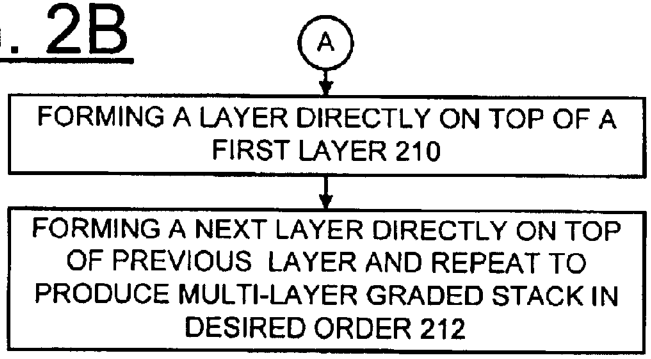
FIG. 2B
A
FORMING A LAYER DIRECTLY ON TOP OF A FIRST LAYER 210
FORMING A NEXT LAYER DIRECTLY ON TOP OF PREVIOUS LAYER AND REPEAT TO PRODUCE MULTI-LAYER GRADED STACK IN DESIRED ORDER 212

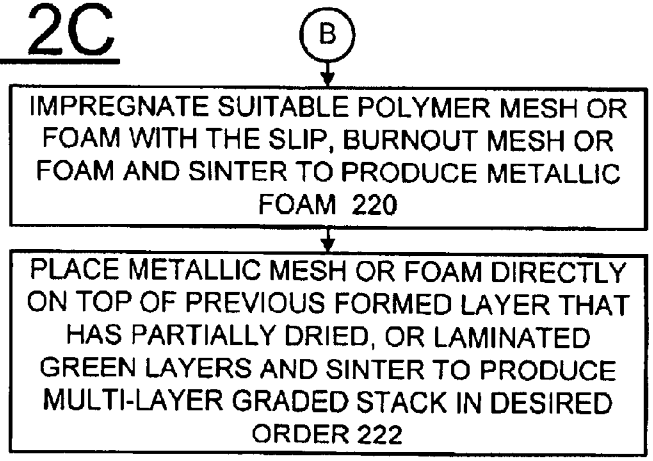
FIG. 2C
B
IMPREGNATE SUITABLE POLYMER MESH OR FOAM WITH THE SLIP, BURNOUT MESH OR FOAM AND SINTER TO PRODUCE METALLIC FOAM 220
PLACE METALLIC MESH OR FOAM DIRECTLY ON TOP OF PREVIOUS FORMED LAYER THAT HAS PARTIALLY DRIED, OR LAMINATED GREEN LAYERS AND SINTER TO PRODUCE MULTI-LAYER GRADED STACK IN DESIRED ORDER 222

COMPOSITIONALLY GRADED METALLIC PLATES FOR PLANAR SOLID OXIDE FUEL CELLS

RELATED APPLICATION

A related U.S. patent application Ser. No. 10/167,917, by John David Carter, Joong-Myeon Bae, Terry A. Cruse, James Michael Ralph, Romesh Kumar, and Michael Krumpelt and assigned to the present assignee is being filed on the same day as the present patent application entitled "SOLID OXIDE FUEL CELL WITH ENHANCED MECHANICAL AND ELECTRICAL PROPERTIES".

CONTRACTUAL ORIGIN OF THE INVENTION

The United States Government has rights in this invention pursuant to Contract No. W-31-109-ENG-38 between the United States Government and Argonne National Laboratory.

FIELD OF THE INVENTION

The present invention relates to a method for preparing compositionally graded metallic plates; and more particularly, relates to a method for preparing compositionally graded metallic plates and compositionally graded metallic plates suitable for use as interconnects for solid oxide fuel cells, and various other applications.

DESCRIPTION OF THE RELATED ART

A planar solid oxide fuel cell (SOFC) consists of an anode and a cathode separated by a solid electrolyte. A SOFC stack consists of a series of cells, stacked one above the other, in which the anode of one cell and the cathode of the adjacent cell are separated by an interconnect or bipolar plate. The bipolar plate serves two primary functions, (1) it prevents the mixing of the fuel and oxidant gases provided to the anode and cathode of the cells, and (2), it serves to connect the adjacent cells in electrical series. The bipolar plate may also provide the flow channels to direct the fuel and oxidant gases to the appropriate electrode. To function properly, the bipolar plate material must be dense enough to prevent mixing of the fuel and oxidant gases, electrically conductive, chemically and mechanically stable under the fuel cell's operating environment, oxidizing and reducing conditions, temperatures up to 1000° C. for the high temperature SOFCs and up to 800° C. for the lower temperature SOFCs, and its coefficient of thermal expansion should be close to $1–0.5\times 10^{-5}/°$ C. for zirconia-based SOFCs.

Two classes of materials have been or are being used for SOFC bipolar plates. One is ceramic, based primarily on lanthanum chromite. This material offers good stability and adequate electrical conductivity at 1000° C. A number of papers and patents have been published based on improving the properties and processability of lanthanum chromite. Some of the patents are U.S. Pat. Nos. 4,749,632; 5,049,456; 5,143,751; 5,185,301; 5,298,469; and 5,958,304. However, the electrical conductivity of lanthanum chromite decreases rapidly with decreasing temperatures, so that it is not acceptable at temperatures of 800° C. or lower.

For SOFCs operating at 800° C. or less a second class of materials, high temperature metallic alloys such as ferritic steels are being investigated. To be suitable for solid oxide fuel cells, the metallic bipolar plate has to have a thermal expansion coefficient that is fairly similar to the ones of the ceramic components, a criterion that is meet by ferritic stainless steels. Another requirement is corrosion resistance of the metal to air on the cathodic side of the cell and to hydrogen, humid or dry, on the anodic side. When steels are used in a corrosive environment, the composition becomes important. For exposures to steam and/or air at elevated temperatures, fairly high chromium content is usually desirable because chromium forms a protective oxide layer on the surface. However, chromium has been found to migrate from the bipolar plate into the cathode material and deactivate the cathode. High chromium content of the metal is therefore not desirable on the cathodic side of the bipolar plate. For such a situation, it is very difficult to find one composition of steel or other metals or alloys that is suitable for both oxidizing and reducing environments. Such applications are often addressed by using a different material as a coating or surface laminate on one or both sides of the plate.

Presently papers and patents for metallic interconnect devices have focused on using commercially available stainless steels and iron and nickel based super alloys. For coating the primary work seems to have focused on the use of lanthanum chromite based coatings. Some of the patents of interest regarding these materials include U.S. Pat. Nos. 5,733,682; 5,942,349; 6,054,231; 6,265,095; 6,280,868; and 6,326,096.

The problem is that commercially available ferritic stainless steels are not corrosion resistant enough for application in SOFCs, and modifying the composition to obtain better corrosion resistance would require a production volume that is not economically feasible. Applying coatings on the surface of ferritic steels, as suggested by other researchers, is both expensive and difficult. Another alternative is traditional powder metallurgy, which includes metal injection molding, sinter forging, hot and cold isostatic pressing, and the like. While these processes work well for producing complex shapes, they are not cost effective for producing the types of shapes need for SOFCs. Another aspect of these processes is that the product has an essentially uniform composition throughout.

A need exists for a method of preparing bipolar plates in a variety of compositions that will meet the corrosion requirements and operating requirements of fuel cells in a cost effective manner.

A principal object of the present invention is to provide a method for preparing compositionally graded metallic plates and compositionally graded metallic plates suitable for use as interconnects for solid oxide fuel cells and various other applications.

Other important objects of the present invention are to provide such method for preparing compositionally graded metallic plates and compositionally graded metallic plates suitable for use as interconnects for solid oxide fuel cells and various other applications substantially without negative effect; and that overcome some disadvantages of prior art arrangements.

It should be understood that as used in the following specification and claims the term metallic plates means metal plates and metal based plates that may contain non-metallic components.

SUMMARY OF THE INVENTION

In brief, a method for preparing compositionally graded metallic plates and compositionally graded metallic plates suitable for use as interconnects for solid oxide fuel cells are provided.

A powder of the desired alloy composition is obtained, then solvents, dispersants, a plasticizer and an organic binder are added to form a slip. The slip is then formed into a layer on a desired substrate that can be flat or textured. Once dried, the layer is removed from the substrate and the binder is burned out. The layer is sintered in a reducing atmosphere at a set temperature for a predefined duration specific to the materials used and the desired final properties.

In accordance with features of the invention, plates with graded composition, from one side to the other, may be prepared by forming layers of different slips on top of each other, or laminating together separately prepared green layers, using a small amount of solvent between the layers or warm pressing together. The slip may also impregnate a mesh or foam, which is then burned out and sintered, resulting is the formation of metallic mesh or foam. The method of the invention, utilizing powder metallurgy, enables making metallic plates of generally any desired composition to meet the corrosion requirements of fuel cells and other applications, and enables making metallic plates of graded composition from one surface of the plate to the other.

BRIEF DESCRIPTION OF THE DRAWINGS

The present invention together with the above and other objects and advantages may best be understood from the following detailed description of the preferred embodiments of the invention illustrated in the drawings, wherein:

FIGS. 2A, 2B, and 2C are flow charts illustrating alternative exemplary steps for producing a desired thickness or functionally graded metallic plates in accordance with the preferred embodiment;

DETAILED DESCRIPTION OF THE PREFERRED EMBODIMENTS

In accordance with features of the invention, a method for preparing compositionally graded metallic plates and compositionally graded metallic plates suitable for use as interconnects for solid oxide fuel cells (SOFCs) in a cost effective manner are provided. The method of the invention, utilizing powder metallurgy, enables making metallic plates of generally any desired composition to meet the corrosion requirements of fuel cells and other applications, and enables making metallic plates of graded composition from one surface of the plate to the other. Also the method of the invention enables producing a textured surface on these materials that may serve as flow channels for SOFC interconnect applications. A unique process is provided for the production of metallic foams of unique compositions. For SOFC applications these foams may serve as flow fields for fuel and oxidant gases.

Figure 1:
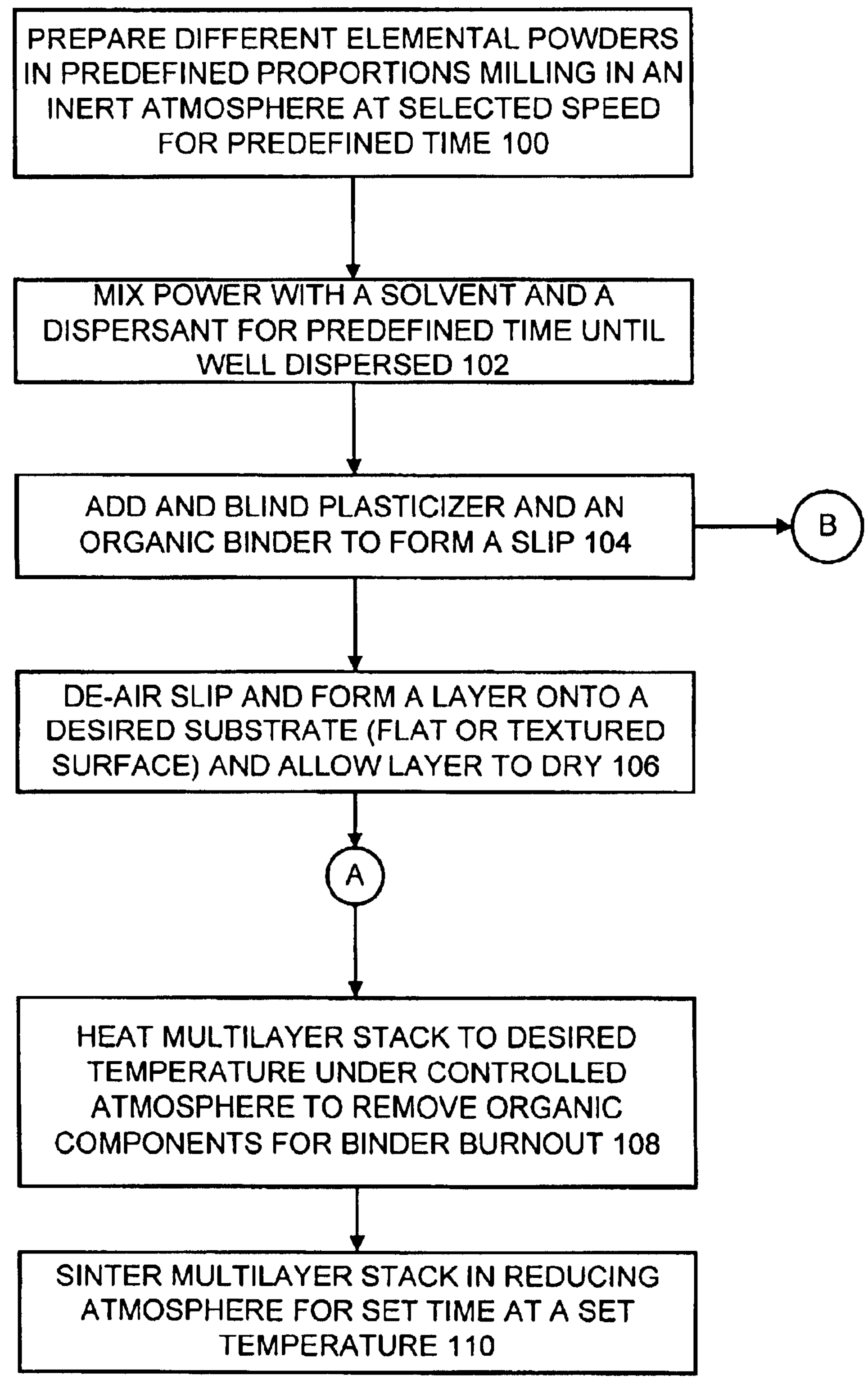
FIG. 1 is a flow chart illustrating exemplary steps for making a metal or metal alloy plates utilizing powder processing in accordance with the preferred embodiment.

Having reference now to the drawings, in FIG. 1 there are shown exemplary steps for making a metal or metal alloy plates in accordance with the preferred embodiment. To make the bipolar plates of any desired composition, first a powder of each desired alloy is obtained from commercial sources or by mechanical alloying of the desired materials to provide different elemental powders as indicated in a block 100. Other suitable methods for powder preparation, such as atomization, may also be used. Each powder is then mixed together with appropriate solvents and dispersants until well dispersed as indicated in a block 102. Once the powder is well dispersed, a plasticizer and an organic binder, either thermosetting or thermoplastic, are added and blended together to form a slip for each of the different elemental powders as indicated in a block 104.

The slip is de-aired and then formed in a layer on a desired substrate and allowed to dry as indicated in a block 106. For example, tape-casting or various other techniques can be used to form the layer at block 106. The substrate may be a flat surface, or a textured surface to produce a patterned or structured layer, such as a grooved layer illustrated in FIG. 3. Further exemplary processing steps for the layer formed at block 106 are illustrated and described in FIGS. 2A and 2B. When the layer is dry or after further processing, the layer or multiple layers undergo binder burnout as indicated in a block 108. This is a relatively slow process, in which the layer or multiple layer stack is heated to a desired temperature under a controlled atmosphere to remove the organic components of the layer without altering the structure that is, by preventing the boiling out of the organics. After binder burnout, the layer or multiple layer stack is sintered in a reducing atmosphere for a specified time at a set temperature as indicated in a block 110. The time, temperature and atmospheric parameters are specific to the materials being used and the desired final properties.

Referring now to FIGS. 2A, 2B, and 2C, to produce plates with a graded composition from one side to the other, several different processes can be used as illustrated.

In FIG. 2A, one process is to laminate together separately prepared green layers optionally having a small amount of solvent painted between the layers to promote bonding as indicated in a block 200. The green layers may also be warm pressed together as indicated in a block 202. Using a thermosetting binder, the layers may be warm pressed together with a textured die to yield a desired textured surface as indicated in a block 204.

In FIG. 2B, another process is to simply cast layers of different slips on top of each other. As shown in blocks 210 and 212, a layer is formed directly on top of a first layer; then a next layer is formed directly on top of a previous layer and repeated to produce a multi-layer graded stack in a desired order.

In FIG. 2C, another process is that the slip formed at block 104 may also impregnate or coat a polymer mesh or foam. The foam is then burned out in the same manner as the binder and sintered. This results in the formation of a metallic foam as indicated in a block 220. As with the simple single layer proper selection of the processing conditions and the starting foam are need to produce the desired product. The green foam may be placed on top of previously formed green layer that has partially dried or on laminated green layers as indicated in a block 222, and sintered together, for example, resulting in a flow field for SOFC applications.

While SOFC applications are the primary concern of the methods of the invention, it should be understood that various other applications advantageously can take advantage of the unique properties that can be produced from these materials for weight reduction, energy dispersion or other characteristics.

EXAMPLES

Alloy Processing

Novel alloys have been prepared using mechanical alloying to prepare powders. For this, the different elemental powders in the desired proportions are placed in the milling jar with the milling media and a lubricant, such as ethanol, if needed. The jar is sealed under an inert atmosphere and then placed in the high-energy ball-mill at a selected speed for a specified time. Powder X-ray diffraction is used to determine if complete alloying has occurred. An example alloy that we have prepared as a 50 g batch by this means consisted of 25 wt % chromium, 1 wt % lanthanum, 0.63 wt % yttrium, 0.31 wt % strontium, and balance wt % iron. Elemental powders of all the starting materials or 25% Cr, 1% La, 0.63% Y, and balance Fe by weight, except 0.31% Sr, for which a carbonate was used, were milled with 3-wt % ethanol for 48 h. After milling only iron was observed by powder x-ray diffraction.

After milling, the powder is mixed with a solvent and a dispersant, such as, for 24 h. Then a binder and plasticizer is added and allowed to mix for 18 h. Cross-linking agents may be added to make some of the binder systems thermosetting. All of these steps are carried out under an inert atmosphere.

After the slip has been prepared, it is de-aired and formed in a layer on a glass plate, typically as a 0.025-in thick layer. It should be understood that the layer can be thicker or thinner, as desired. The layer is allowed to dry overnight. The layer is then removed from the glass plate or slide and cut into the desired shape or shapes.

The binder is burned out of the layer by slowly heating the layer in nitrogen; alternatively, air may also be used. Once the binder has been removed, the material is sintered under hydrogen, typically at 1300° C. for 2 h. The specimens are then cooled under hydrogen, removed, and polished, if needed, before use. EDS analysis of finished products has shown that the material has a uniform elemental composition similar to that of the originally mixed powders, within the error of the equipment.

This alloy of 25% Cr, 1% La, 0.63% Y, 0.31% Sr, balance Fe by weight showed a similar oxidation rate, and a superior electrical conductivity after oxidation, compared with commercially available 434 stainless steel powder processed in the same manner. After 400 h at 800° C. in humid air, for example, 25% relative humidity, the weight gain was approximately 0.1% for both materials while the area specific resistance of our alloy was 1.0 $\Omega cm^2$ compared to 15.5 $\Omega cm^2$ for a commercial stainless steel, 434. When layers of 434 stainless steel were sandwiched between surface layers of the Fe—Cr—La—Y—Sr alloy, the results were similar to those for the bulk Fe—Cr—La—Y—Sr alloy. This verifies that by appropriately tailoring the alloy composition, enables improving the properties of interest, and these properties can be maintained in a laminated material. This fabrication process works well on small research scale production and can be readily scaled up for larger sizes and volumes of production.

Stacking and Laminating Example

If the final desired thickness or functionally graded material is not achieved in a single layer or functionally graded laminated materials are desired, then the method of FIG. 2A can be performed. Functionally graded or laminated materials may be prepared by wiping a solvent on one or both surfaces of each layer and stacking multiple layers in the desired order at block 200. These multi-layers are then warm pressed to help ensure good adhesion between the layers at block 202. While the use of the solvent and warm pressing are helpful in this, the steps are optional and not absolutely necessary.

Laminates Example

Figure 3:
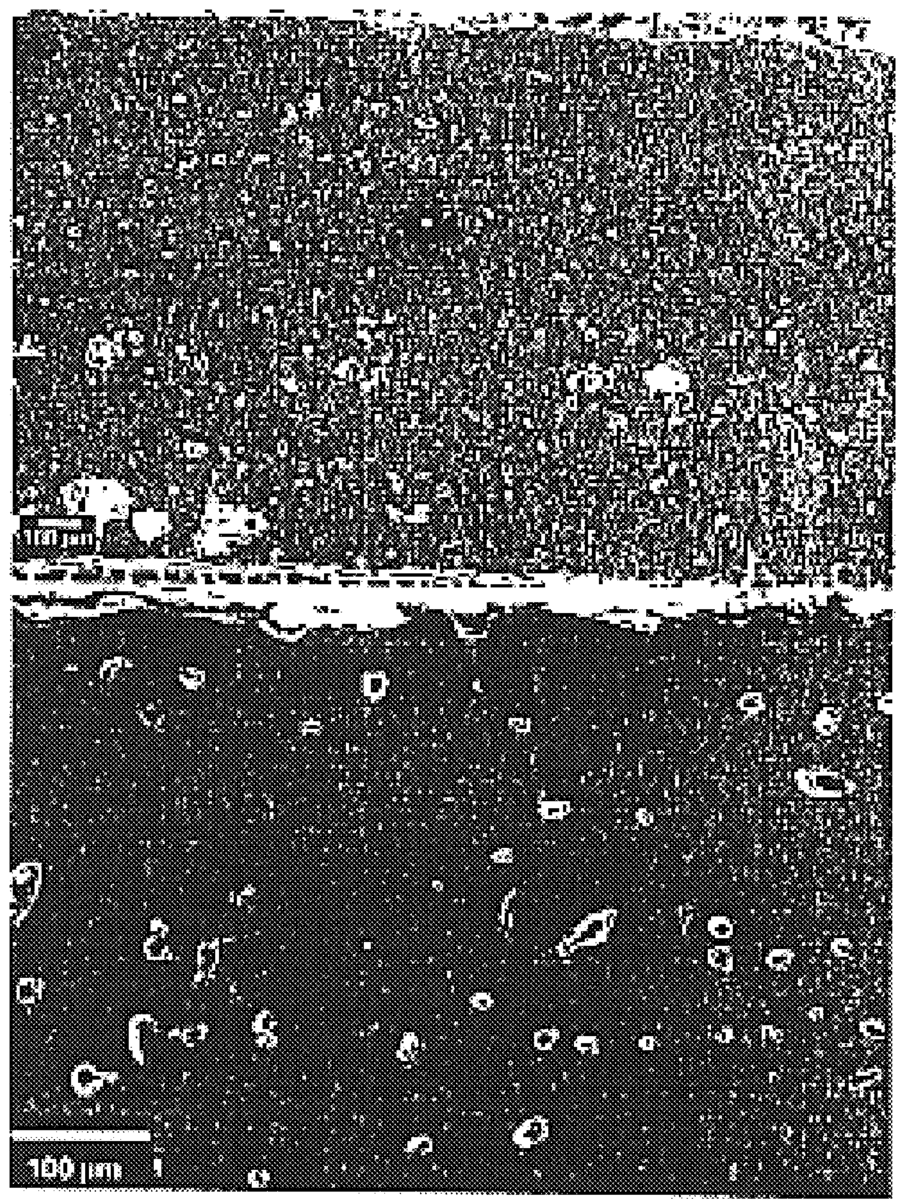
FIG. 3 is a scanning electron microscope (SEM) photomicrograph of cross section of a seven layer plate formed by successive layers formed directly on top of previous layers in accordance with the preferred embodiment.

FIG. 3 illustrates a SEM photomicrograph of cross section of a seven layer plate. Successive layers were provided by forming one layer directly on top of previous layers in accordance with another method of producing a thicker plate or a functionally graded material by the process of FIG. 2B. The top image shown in FIG. 3 is the complete cross section, while the bottom image is an enlargement of the top portion.

Preparing Functionally Graded Materials

Both methods as illustrated in FIGS. 2A, and 2B, may be used to produce functionally graded materials, so that layers of different compositions to be placed where that composition is most needed. This allows for specific control of the thermal, mechanical, and corrosion properties of the laminate.

Figure 4:
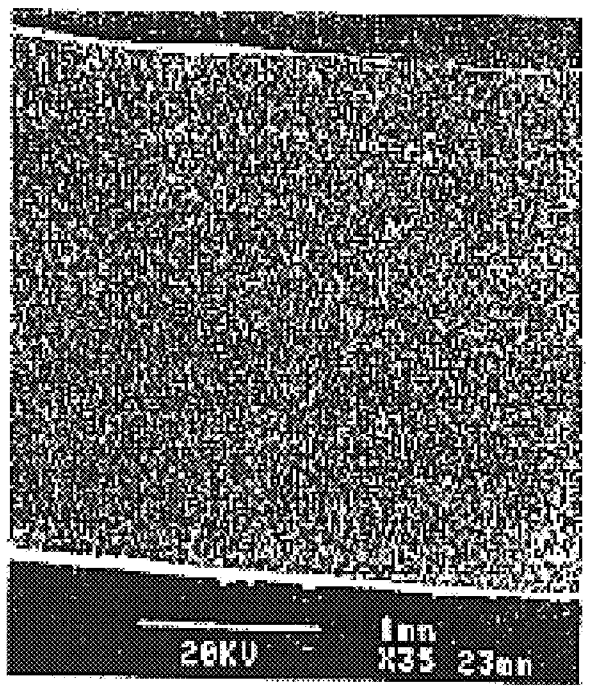
FIG. 4 is a SEM photomicrograph of cross section of an exemplary laminate of a first alloy defining surface layers and 434 stainless steel layers as the middle layers in accordance with the preferred embodiment.

FIG. 4 is a SEM photomicrograph of cross section of an exemplary laminate of a first alloy defining surface layers and ferritic stainless steel or 434 stainless steel layers as the middle layers in accordance with the preferred embodiment. Materials were prepared using the above-described Fe—Cr—La—Y—Sr alloy as surface layers and 434 stainless steel layers as the middle layers of the specimen. These specimens gave surface properties similar to the bulk alloy, which were superior to those of the 434 stainless steel specimens. Thus, the bulk and the surface properties can be tailored to meet specific criteria. This approach minimizes the use of expensive alloying elements by localizing them to where they are needed and not throughout the entire finished plate.

In the illustrated laminate shown in FIG. 4, EDS analysis showed that points 1 and 2 contained 1.5 to 2 wt. % La, while points 3 and 4 contained no La. Similar EDS results were observed from the bottom. Given that starting materials had similar characteristics, such as particle size, sinterability, and the like, the slips had the same compositions and were cast at the same thickness it is easy to determine the final thickness of each layer. Between points 2 and 3, and at a similar distance on the bottom, the compositions were observed to change. This indicates that there was little diffusion of the alloying elements into the bulk material.

Structured Surface Example

Figure 5:
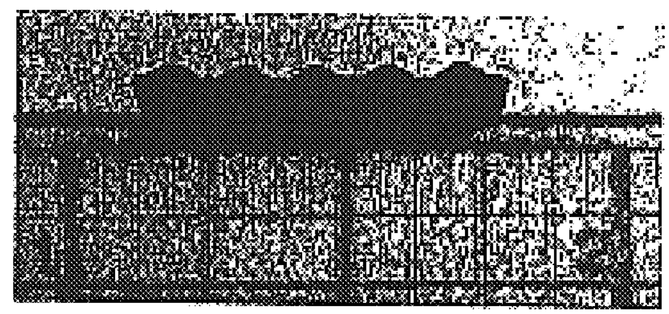
FIG. 5 illustrates an exemplary plate produced by forming a layer on a grooved surface in accordance with the preferred embodiment.

FIG. 5 illustrates a specimen produced by forming a layer on a grooved surface. FIG. 5 illustrates the capability of the invented process to produce plates with textured surfaces, such as grooved, channeled, or other micro or macro features. The texturing can be done as part of the processing, for example, forming on a negatively textured surface. This offers and advantage in that it is much easier to produce this structure during processing rather than to perform a stamping or machining process on a sheet of metal. This process may be used for materials that are too brittle to be stamped or machined. A functionally graded/layered material may then be produced by either of the above-described methods of FIG. 2A or FIG. 2B.

Secondary Processing to Produce a Structured Surface

Using the above described methods of producing functionally graded or simple laminate layers, warm pressing may also be used to produce a structured surface by placing the green layer between dies designed to give the desired shape, heating the green layer to the plastic deformation range of the selected binder, and pressing typically using a relatively small load. Once the layer has been pressed, it is heated to a temperature to initiate cross-linking within the binder system to lock in the desired shape as indicated at block 204 in FIG. 2A. Other methods, such as cutting or machining could also be carried out on the green layer, which are much easier to process than metallic plates.

Producing a Foam/Mesh

Another type of a structured surface is a porous structure, such as a mesh. To produce this type of structure, we prepare a slip of composition similar to that used for forming a layer at block 104 of FIG. 1. Then a suitable mesh or foam, such as a polymer mesh or foam, is impregnated with this slip at block 220 in FIG. 2C. The green mesh/foam can then be placed on either a formed layer that has been allowed to partially dry, or laminated as described above for conventional green layers at block 222 in FIG. 2C.

Figure 6:
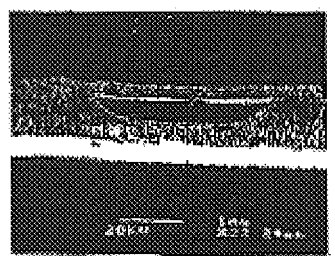
FIGS. 6, 7, and 8 respectively illustrate exemplary porous structure including a formed flow field in dense material, a formed flow field with porous layers, and a macro-porous flow field.
Figure 7:
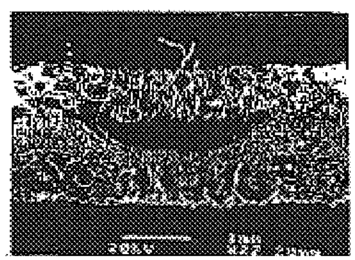
Figure 8:
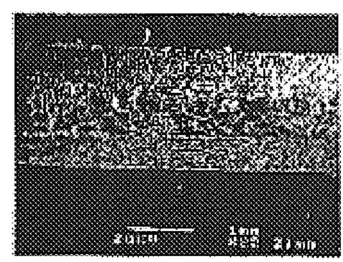

FIGS. 6, 7, and 8 respectively illustrate exemplary porous structures including a formed flow field in dense material, a formed flow field with porous layers, and a macro-porous flow field.

Additional Areas of Application

Apart from solid oxide fuel cell applications, it should be understood that there are a number of other areas where the invented process may be useful including, for example, metallic filters, reduced weight for aerospace applications, energy absorbing layers, bimetallic plates, functionally graded materials to bond alloys of different thermal expansions or other characteristics, functionally graded materials for separators where each side sees a different environment, and functionally graded electronic materials.

The following Table 1 lists specific alloy composition fabricated in sent invention as follows:

TABLE 1

Specific alloy compositions fabricated by the invented process

| Alloy | Composition in wt % |
|---|---|
| 1 | Fe-25Cr |
| 2 | Fe-25Cr-1La |
| 3 | Fe-25Cr-2La |
| 4 | Fe-25Cr-1Y |
| 5 | Fe-25Cr-2Y |
| 6 | Fe-25Cr-1La-0.64Y |
| 7 | Fe-25Cr-2La-1.28Y |
| 8 | Fe-25Cr-1La-0.64Y-0.31Sr |
| 9 | Fe-25Cr-2La-1.28Y-0.62Sr |
| 10 | Fe-5Nb |
| 11 | Fe-10Nb |
| 12 | Fe-5Nb-5V |
| 13 | Fe-5Nb-5V-1Mo |

The following Table 2 lists example powder compositions in accordance with the present invention as follows:

TABLE 2

Example composite compositions:

| Metal (bulk of Material) | Second phase (of material) |
|---|---|
| Alloy 8 | $La_{0.8}Sr_{0.2}CrO_3$ (oxide) |
| Alloy 8 | $CrB_2$ (boride) |
| Alloy 8 | CrN (nitride) |
| Alloy 8 | $TiCr_2$ (intermetallic) |

Sr of Alloy 8 listed in Table 1 does not exist as a metal by itself under most conditions, so to incorporate Sr into the alloy, $Sr(NO_3)_2$ that will decompose during processing has been used to provide the desired alloy including 25 wt % chromium, 1 wt % lanthanum, 0.63 wt % yttrium, 0.31 wt % strontium, and balance wt % iron. Alternatively, a carbonate could be used. The key is that elemental powders are obtained and mixed so that during sintering a desired final product is produced.

Another option is the use of composites, such as the materials listed in Table 2. These composites may be stable or formed during processing and used to impart properties to the resulting final product, such as oxide dispersion strengthened metal. For solid oxide fuel cell applications, such composites may be used to improve or control the desired properties, such as corrosion resistance, electrical conductivity, mechanical properties, and thermal expansion. These materials are also difficult to process as a bulk sheet; however, as a composite with a bulk metallic phase processing is easier.

While the present invention has been described with reference to the details of the embodiments of the invention shown in the drawing, these details are not intended to limit the scope of the invention as claimed in the appended claims.

What is claimed is:

1. A method of making metal or metal alloy plates comprising the steps of:

obtaining a powder of a predefined composition, adding solvents, dispersants, a plasticizer and an organic binder to said powder to form a slip;

forming said slip into a layer on a substrate;

forming an additional layer directly on said layer and forming a plurality of additional layers directly on previous layers to provide a multiple layer graded stack in a defined order;

heating said multiple layer graded stack to a predefined temperature for burning out said binder; and sintering said layer in a reducing atmosphere at a set temperature for a predefined duration.

2. A method of making metal or metal alloy plates as recited in claim 1 wherein said substrate is a selected one of a flat substrate or a textured substrate.

3. A method of making metal or metal alloy plates as recited in claim 2 wherein said textured substrate is used to produce a structured layer.

4. A method of making metal or metal alloy plates as recited in claim 1 wherein the step of forming an additional layer directly on said layer and forming a plurality of additional layers directly on previous layers includes the steps of stacking a plurality of separately formed green layers in a defined order.

5. A method of making metal or metal alloy plates comprising the steps of:

obtaining a powder of a predefined composition, adding solvents, dispersants, a plasticizer and an organic binder to said powder to form a slip;

forming said slip into a layer on a substrate;

stacking a plurality of separately formed green layers in a defined order on said layer on said substrate to provide a multiple layer stack; each said plurality of separately formed green layers has a predefined composition to provide surface layers and interior bulk layers of different properties;

heating said multiple layer stack to a predefined temperature for burning out said binder; and sintering said layer in a reducing atmosphere at a set temperature for a predefined duration.

6. A method of making metal or metal alloy plates as recited in claim 5 further includes the steps of warm pressing the stack multiple layers between dies, said dies arranged to provide a predefined shape, and heating to a plastic deformation range of a selected binder, heating and pressing to produce cross-linking with the binder to lock a desired shape.

7. A method of making metal or metal alloy plates as recited in claim 4 further includes the steps of warm pressing the stack of multiple layers between dies, said dies arranged to provide a predefined shape, and heating to a plastic deformation range of a selected binder, heating and pressing to produce cross-linking with the binders of the stack of multiple layers to lock a desired shape.

8. A method of making metal or metal alloy plates comprising the steps of:

obtaining a powder of a predefined composition, adding solvents, dispersants, a plasticizer and an organic binder to said powder to form a slip;

forming said slip into a layer on a substrate;

removing said layer from the substrate and burning out said binder;

sintering said layer in a reducing atmosphere at a set temperature for a predefined duration; and forming a stack of multiple separately formed layers in a desired order to produce a metallic, functionally graded bipolar plate for solid oxide fuel cell applications; said metallic, functionally graded bipolar plate being corrosion resistant both fuel and air environments at set high temperatures and having high electrical conductivity.

9. A method of making metal or metal alloy plates as recited in claim 8 wherein the step of obtaining a powder of said predefined composition includes the step of obtaining a powder of a composition of at least one metal and selected materials of oxides, borides, carbides, carbonitrides, silicides, sulfides, nitrides, and intermetallics.

10. A method of making metal or metal alloy plates as recited in claim 8 wherein the step of forming said stack of multiple separately formed layers in a desired order to produce a metallic, functionally graded bipolar plate for solid oxide fuel cell applications includes the steps of forming surface layers of said plate of an alloy composition including 25 wt % chromium, 1 wt % lanthanum, 0.63% yttrium, 0.31 wt % strontium, and balance wt % iron and forming interior bulk layer of ferritic stainless steel; said ferritic stainless steel including type 434 stainless steel.

* * * * *